Sept. 6, 1966     G. MIKKELBORG     3,271,491
METHOD OF PREPARING WITHIN A MOLD OF RUBBER OR OF A MATERIAL
HAVING SIMILAR PROPERTIES SHAPES OF WAX OR SIMILAR
MATERIALS FOR USE IN THE SO-CALLED
LOST-WAX-MOLDING METHOD
Filed Jan. 23, 1962
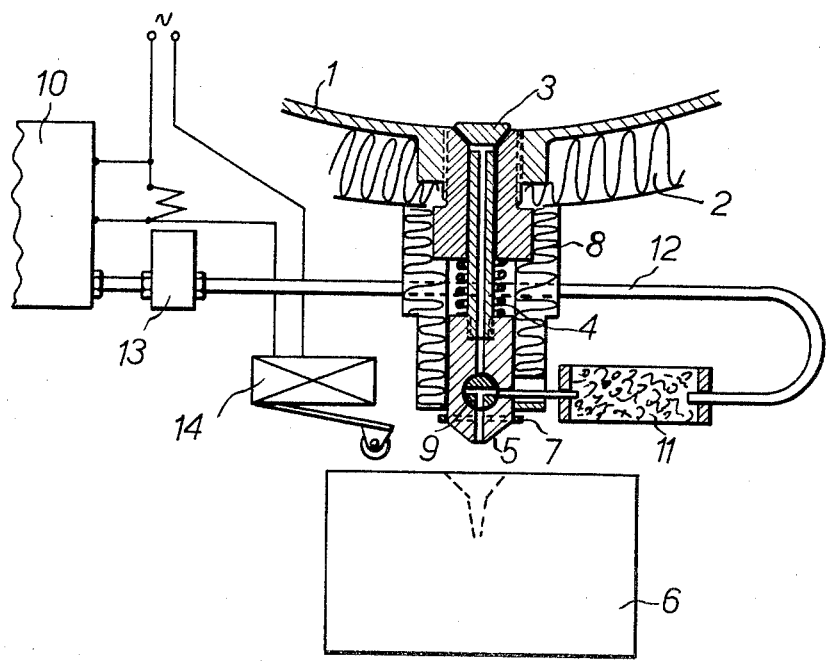
INVENTOR
GUNNAR MIKKELBORG
BY
*Albert M. Parker*
ATTORNEY 3,271,491
METHOD OF PREPARING WITHIN A MOLD OF RUBBER OR OF A MATERIAL HAVING SIMILAR PROPERTIES SHAPES OF WAX OR SIMILAR MATERIALS FOR USE IN THE SO-CALLED LOST-WAX-MOLDING METHOD
Gunnar Mikkelborg, Villaveien 11, Notodden, Norway
Filed Jan. 23, 1962, Ser. No. 168,182
1 Claim. (Cl. 264—102)

The present invention relates to a method and apparatus for molding articles within a mold of rubber or of a material having similar properties, shapes of wax or similar materials, for use in the so-called "lost-wax"-molding method.

When preparing shapes of the above mentioned type it is important that the molding material is caused to fill in even the smallest details in the mold and for this purpose the molding material has been subjected to a high pressure. The pressure thereby used is usually so high that the rubber mold easily becomes deformed in the joint between the mold halves, whereby a most undesired burr is formed.

Further it is known, when casting in a rigid mold, to use evacuation of the mold in order to accelerate the introduction of the molding material.

The object of the invention is to provide a method of preparing shapes or patterns of wax or similar substances whereby formation of a molding burr is avoided.

According to the invention this is obtained when the molten wax or equivalent molding material is drawn into an evacuated mold by suction. In this manner the liquid wax at low pressure penetrates into even the finest details of the mold, without deforming the mold so that a molding burr is not formed.

The invention will be more readily understood by referring to the following description taken in connection with the accompanying drawing which is an elevational view, partly in cross section, of a machine for practicing the invention.

A wax pot 1, containing molten wax under pressure is provided with an exterior insulation 2 and at its bottom with a seat valve 3, through which wax may become extruded from the pot. The seat valve 3 is closed by a helical spring 4, and the outer end of the valve rod carries a nozzle 5, which provides communication with the opening in the rubber mold 6, which, when it is to be filled, is pressed against the nozzle, which latter then opens the seat valve 3. The nozzle 5 is provided with a flange 7, and when the nozzle is moved inwards said flange 7 abuts against the outermost edge portion of an insulating cap 8, which surrounds the seat valve and the nozzle. Said nozzle further is provided with a two-way valve 9, which interconnects the nozzle opening with a vacuum pump 10 through a filter 11, a conduit 12 and an electromagnetic valve 13. Filter 11 collects the wax to prevent it from passing to the vacuum pump 10. Said electromagnetic valve is controlled by means of a switch 14 which, when engaged by the rubber mold 6, energizes winding 14' which opens the valve 13 and starts the vacuum pump.

The arrangement described operates in the following manner:

(I) The rubber mold 6 is pressed against the nozzle opening 5 so that the seat valve 3 opens for admission of wax to the two-way valve 9 which is in the position as shown. At the same time the rubber mold has, by its engagement with the switch 14, opened the electromagnetic valve 13 and connected the vacuum pump 10 to nozzle 5 through conduit 12 and filter 11, so that the rubber mold is evacuated.

(II) By turning the two-way valve at an angle of 90° the mold is placed in direct communication with the wax pot, and the rubber mold is filled with wax.

(III) The rubber mold is removed from the nozzle 5, the switch 14 de-energizes the winding 14' and vacuum pump 10, and the seat valve is closed.

(IV) The device is then prepared for the next operation. The two-way valve 9 is turned back to its first position, so that the amount of wax remaining in the nozzle end is drawn into the filter 11, by means of the remaining sub-pressure in the conduit 12. Thereafter the device is ready for a next operation.

I claim:

A method for molding articles comprising the steps of pressing a mold member into engagement with a nozzle member connected to a zone provided with molding material, establishing communication between said nozzle and a vacuum zone by movement of said mold member toward said engagement, moving said nozzle member from a normally closed position by continued pressing of said mold member thereagainst to an operative position so that said nozzle member is simultaneously connected to said molding material zone to provide molding material thereto and to said vacuum zone, maintaining a valve member in said nozzle member in one position so that said molding material is prevented from entering said mold member while said vacuum zone is connected to said mold member to exhaust said mold member, moving said valve member to another position so that said vacuum zone is disconnected from said mold member and said molding material is allowed to enter said exhausted mold member, and then removing said mold member from said nozzle member so that said nozzle member moves to said normally closed position thereby disconnecting said nozzle member from both of said zones.

References Cited by the Examiner
UNITED STATES PATENTS

| | | | |
|---|---|---|---|
| 2,461,723 | 2/1949 | Cowan | 18—30 |
| 2,668,985 | 2/1954 | Babbitt. | |
| 2,940,123 | 6/1960 | Beck et al. | 18—30 |
| 3,021,568 | 2/1962 | Scott | 264—328 |
| 3,052,925 | 9/1962 | Bronnenkant et al. | 264—328 |

ALEXANDER H. BRODMERKEL, *Primary Examiner.*

MICHAEL V. BRINDISI, *Examiner.*

A. L. LEAVITT, B. SNYDER, *Assistant Examiners.*